(12) United States Patent
Bishop et al.

(10) Patent No.: US 11,663,313 B2
(45) Date of Patent: May 30, 2023

(54) HOST-BASED HARDWARE PERIPHERAL AUTHORIZATION SYSTEM

(71) Applicant: T-Mobile USA, Inc., Bellevue, WA (US)

(72) Inventors: Michael Bishop, Issaquah, WA (US); Shawn David Corey, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 310 days.

(21) Appl. No.: 16/948,562

(22) Filed: Sep. 23, 2020

(65) Prior Publication Data
US 2022/0092167 A1    Mar. 24, 2022

(51) Int. Cl.
*G06F 21/44* (2013.01)
*G06F 21/45* (2013.01)
*G06F 21/85* (2013.01)

(52) U.S. Cl.
CPC .............. *G06F 21/44* (2013.01); *G06F 21/45* (2013.01); *G06F 21/85* (2013.01); *G06F 2221/2111* (2013.01)

(58) Field of Classification Search
None
See application file for complete search history.

(56) References Cited

U.S. PATENT DOCUMENTS

| | | | | |
|---|---|---|---|---|
| 7,877,788 B1* | 1/2011 | Topp | ................... | G06F 21/44 726/17 |
| 2016/0098554 A1* | 4/2016 | Bourque | ............. | G06F 13/4282 726/17 |
| 2016/0182539 A1* | 6/2016 | Edwards | ................. | G06F 21/44 726/23 |
| 2016/0203311 A1* | 7/2016 | Kaines | .................... | G06F 21/73 726/19 |
| 2018/0293408 A1* | 10/2018 | Young | .................... | G06F 21/32 |
| 2021/0248223 A1* | 8/2021 | Chippakurthy | ......... | G06F 9/541 |

* cited by examiner

*Primary Examiner* — Nelson S. Giddins
(74) *Attorney, Agent, or Firm* — Lee & Hayes, P.C.

(57) ABSTRACT

Systems and methods for authenticating a peripheral device prior to allowing the peripheral device access to components and data stored on user equipment. In some examples, the user equipment may include an authorization component that is configured to physically decouple a hardware interface from other components of the user equipment until the authorization component is able to authenticate the peripheral device. Both authorized peripheral devices and the user equipment may be provisioned with authorization data and/or credentials from a system outside the control of the individual users of the user equipment.

14 Claims, 6 Drawing Sheets

HOST-BASED HARDWARE PERIPHERAL AUTHORIZATION SYSTEM

BACKGROUND

One of the most common vulnerabilities of a user equipment or network is the introduction of malicious software via a direct or hardware connection between a peripheral and a networked user equipment. Often, employees and staff utilize personal portable peripheral devices ("peripherals") with regards to both personal devices and company devices. In some cases, the malicious software may be downloaded onto the peripheral while the employee has the peripheral electronically coupled to personal equipment. The malicious software may then be introduced to the company network or devices when the employee couples the peripheral to a company device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
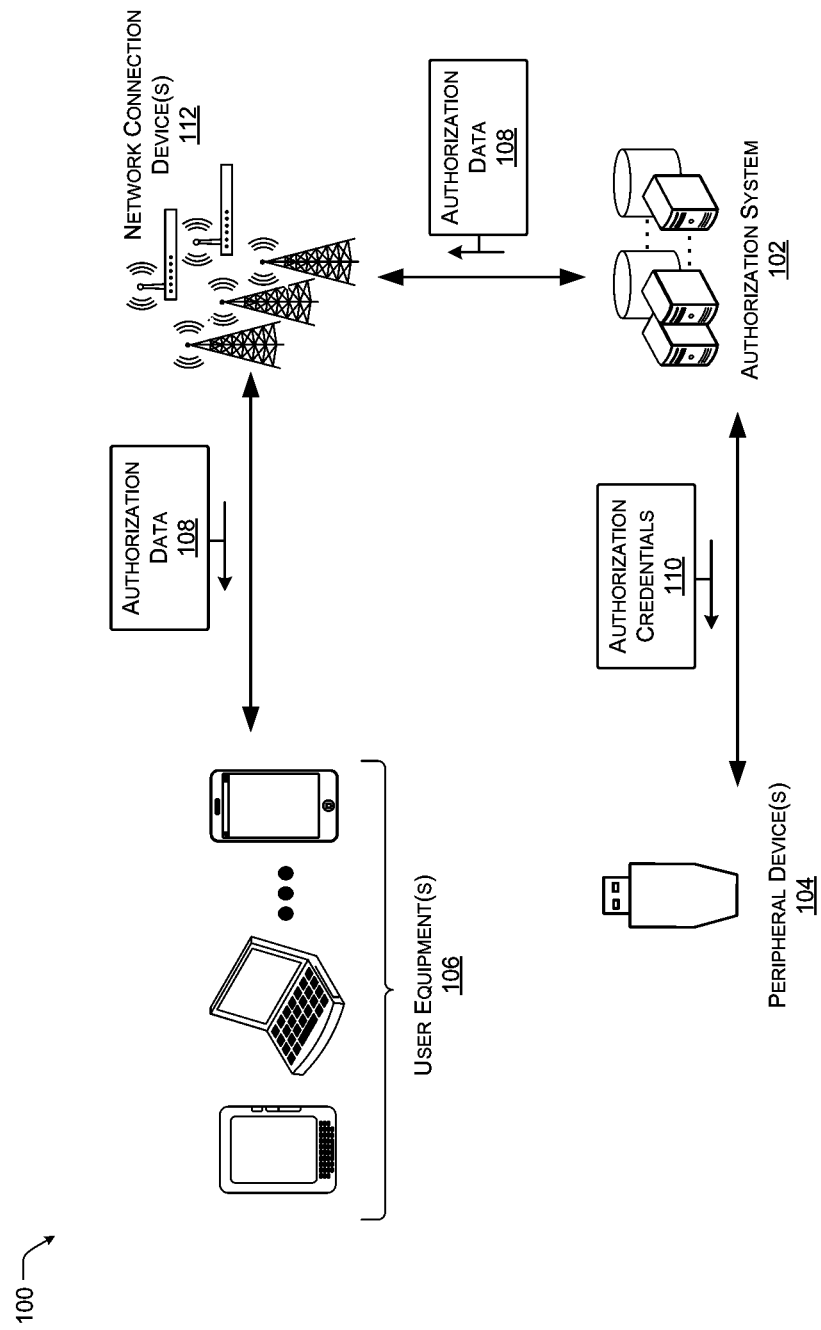
FIG. 1 is an example of a network implementation of the authorization system and authorization components, in accordance with some examples of the present disclosure.

Discussed herein are systems, components, and methods associated with preventing unauthorized peripherals from being electronically coupled or connected to company devices and/or networks. In some implementations, an authorization component or circuit may be introduced into the hardware of a user equipment or user equipment between an external hardware interface (e.g., universal serial bus (USB), mini USB, High-Definition Multimedia Interface (HDMI), and the like) and other components (e.g., processors, memories, sensors, etc.) of the host user equipment.

The authorization component may be configured to receive, via a wireless communication channel, authorization data from a central authorization system. In some cases, the authorization system may transmit or provide the authorization data via a company network when the user equipment, including the authorization component, are connected. The authorization component may store the authorization data in an associated memory. In some cases, the authorization data may include, for example, public/private key pairs, for a challenge response type authorization technique. The authorization system may also be configured to provision various types of peripheral devices that are authorized to access the company user equipment. For instance, the authorization system may provision the peripheral devices with the access credentials associated with the authorization data disseminated via the company network.

In some cases, the authorization system may be configured to update the authorization data on the user equipment and/or the authorization credentials on the peripheral devices when the user equipment is coupled to the company network and/or the peripheral device has been authenticated and allowed access to a company device. For example, the authorization system may be able to delete authorization data associated with specific users, such as when the user is terminated from employment, or with specific peripheral devices, such as when the peripheral device becomes lost or stolen.

In some cases, the authorization data and/or the authorization credentials may be specific to devices and/or peripheral devices associated with specific company employees, roles, clearances, and the like. For example, the authorization system may provision peripheral devices associated with specific users, specific roles (e.g., engineering, marketing, testing, etc.) with different authorization credentials. The authorization system may also send corresponding authorization data to the matching or corresponding company user equipment (e.g., the device assigned to the individual employee, the role or department, etc.). In this manner, the authorization system and company may control and/or prevent peripheral devices from being passed between employees and departments without the proper approval of the company's information technology (IT) departments.

In some cases, the authorization component may be configured to electrically or physically decouple the hardware interface from the other components of the user equipment when the hardware interface is not in use. Then upon an insertion or detection of an insertion coupling a peripheral device to the hardware interface, the authorization component may only electrically or physically recouple the hardware interface to the other components upon a successful authentication of the peripheral device's authorization credentials. In this manner, any malicious software present on the peripheral device is unable to access the components of the user equipment unless the peripheral device is able to authenticate with the authorization component.

In some specific examples, the authorization component may select the authorization data (e.g., the public/private key) based on the current or active user on the user equipment. In this manner, a peripheral device assigned to a first user may not be utilized on a user equipment when a second user is logged in or otherwise active, thereby, allowing the company's IT department to further restrict use of peripheral devices to specific individuals or employees.

FIG. 1 is an example of a network 100 implementation the authorization system 102 and authorization components, in accordance with some examples of the present disclosure. In the illustrated example, the authorization system 102 is in communication with both peripheral devices 104 and user equipment 106. In some cases, the authorization system 102 may be a central system operated by a company's IT department or other centrally managed system. The authorization system 102 may be configured to generate, manage, update, or otherwise allow a user/operator to organize authorization data 108 for use by the authorization components on the user equipment 106 and the authorization credentials 110 for use by the peripheral devices 104.

In this example, the user equipment 106 may be in communication with the authorization system 102 via one or more network connection devices 112. For instance, the user equipment 106 may be coupled to the network 100 via one or more wired (e.g., a docking station) or wireless (e.g., router) systems. In general, the network connection devices 112 may be secured via password authentication and the like, such that unauthorized devices are unable to connect or have limited/restricted access. In some implementations, the authorization system 102 may be able to provision new peripheral devices 104, send new authorization data 108 to the user equipment 106, update the authorization data 108 stored on the user equipment 106 (e.g., change a list of keys), and the like whenever the user equipment 106 are coupled to the network connection devices 112. In some cases, the authorization system 102 may be able reset or update authorization credentials 110 stored on previously provisioned peripheral devices 104 when the peripheral devices 104 is coupled to a user equipment 106 that is coupled or connected to the network 100 via the network connection devices 112. For instance, an operator (such as IT specialist at a company) may cause one or more peripheral devices 104 to delete or change the stored authorization credentials 110 via the network 100 when a current user is terminated from employment, thereby preventing the peripheral devices 104 assigned to the terminated user from accessing the network 100 at all. Likewise, the operator (e.g., the IT specialist at a company) may cause one or more user equipment 106 to delete or change the stored authorization data 108 (e.g., remove a key associated with specific user's peripheral devices 104) via the network 100, thereby preventing the peripheral devices 104 assigned to the terminated user from accessing the corporate user equipment 106.

Figure 2:
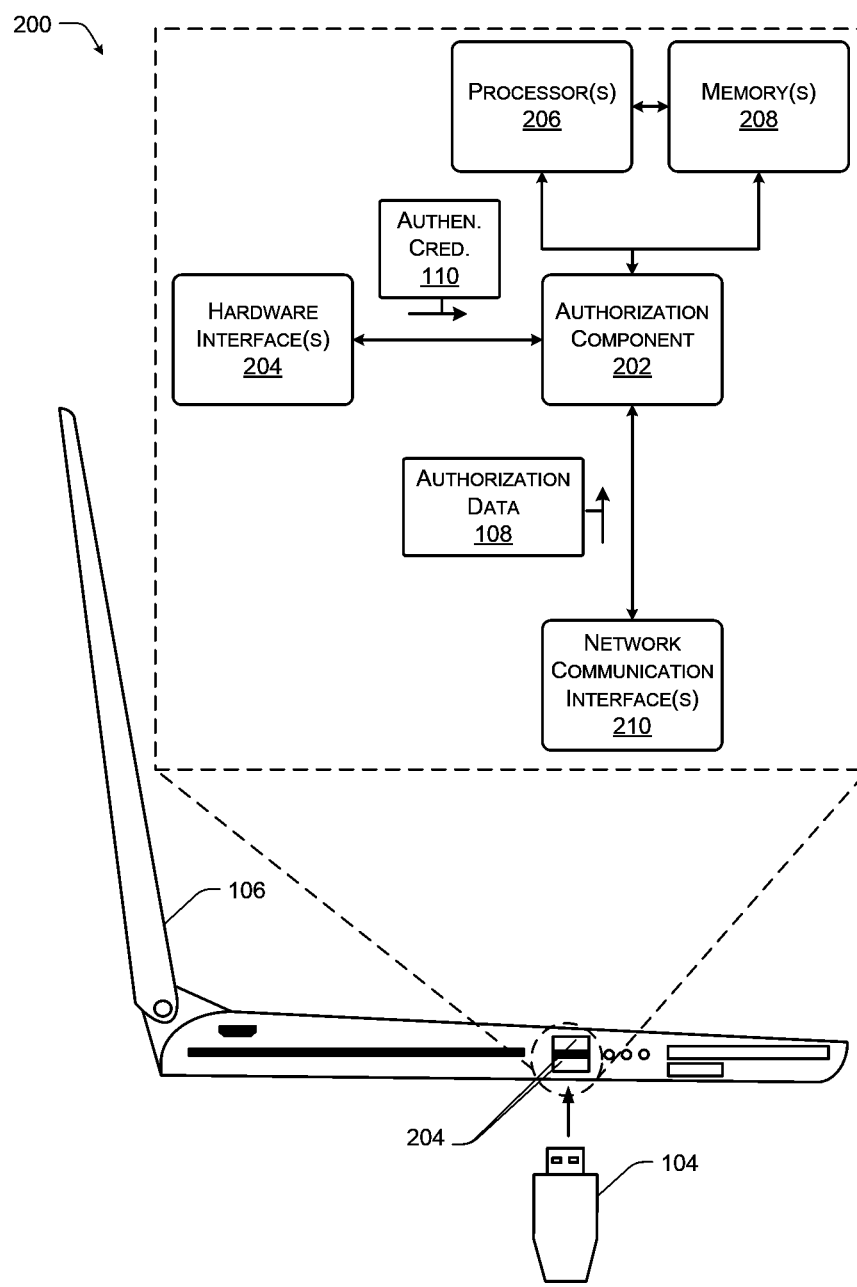
FIG. 2 is an example of an implementation of an authorization component associated with the authorization system of FIG. 1, in accordance with some examples of the present disclosure.

FIG. 2 is an example of an implementation of an authorization component 202 associated with the authorization system 102 of FIG. 1, in accordance with some examples of the present disclosure. In the current example, a user of a user equipment 106 is coupling a peripheral device 104 to a hardware interface 204, such as a USB interface, of the user equipment 106 as shown. Once coupled, the peripheral device 104 may provide authorization credentials 110 to the authorization component 202 via the hardware interface 204.

The authorization component 202 may have decoupled or otherwise prevented the peripheral device 104 from accessing the other components of the user equipment 106, such as the illustrated processors 206, memories 208, and communication interfaces 210. The decoupling of the authorization component 202 from the other components 206-210 of the user equipment 106 may be via software techniques and/or hardware (physical) components. For instance, the authorization component 202 may include one or more physical latches, switches, or the like to prevent data signals from the peripheral device 104 from reaching the other components 206-210. In other examples, the authorization component 202 may implement fire walls, anti-virus systems, malware prevention systems, and the like to block and clean the data transmitted by the peripheral device 104 to the user equipment 106.

In the current example, the authorization component 202 may store authorization data 108, such as private/public keys and the like. The authorization component 202 may then determine if the peripheral device 104 is authorized to access the user equipment 106 based at least in part on the authorization credentials 110 and the authorization data 108. For example, the authorization component 202 may determine a match or pair between a key provided by the peripheral device 104 and a stored key received from an authorization system, such as the authorization system 102 of FIG. 1.

In some specific examples, the authorization component 202 may select the authorization data 108 to use in the authentication challenge response query based on the current or active user on the user equipment, a status of the user equipment (e.g., device categorization by, for instance, the IT department), a location of the device (e.g., docket in a secured lab v. at the user's home), and the like. For instance, some peripheral devices 104, even if authorized for normal use, may not be authorized to couple to a user equipment 106 that is currently docked in a secured or high security clearance lab of the company. In these cases, it should be understood that the key pair used by the authorization component 202 may vary based on, for instance, the current use and current location of the user equipment 106.

Upon detection of a match, the authorization component 202 may couple the hardware interface 204 and the peripheral device 104 to the other components 206-210 of the user equipment 106 and a user of the user equipment 106 may utilize the peripheral device 104 as intended. For example, a mouse or keyboard may be enabled to provide user input to the user equipment 106, a memory device may be read and/or write accessible to the user equipment 106, a sensor or camera may be enabled to capture environmental data and store on the memory 208, and the like.

Figure 3:
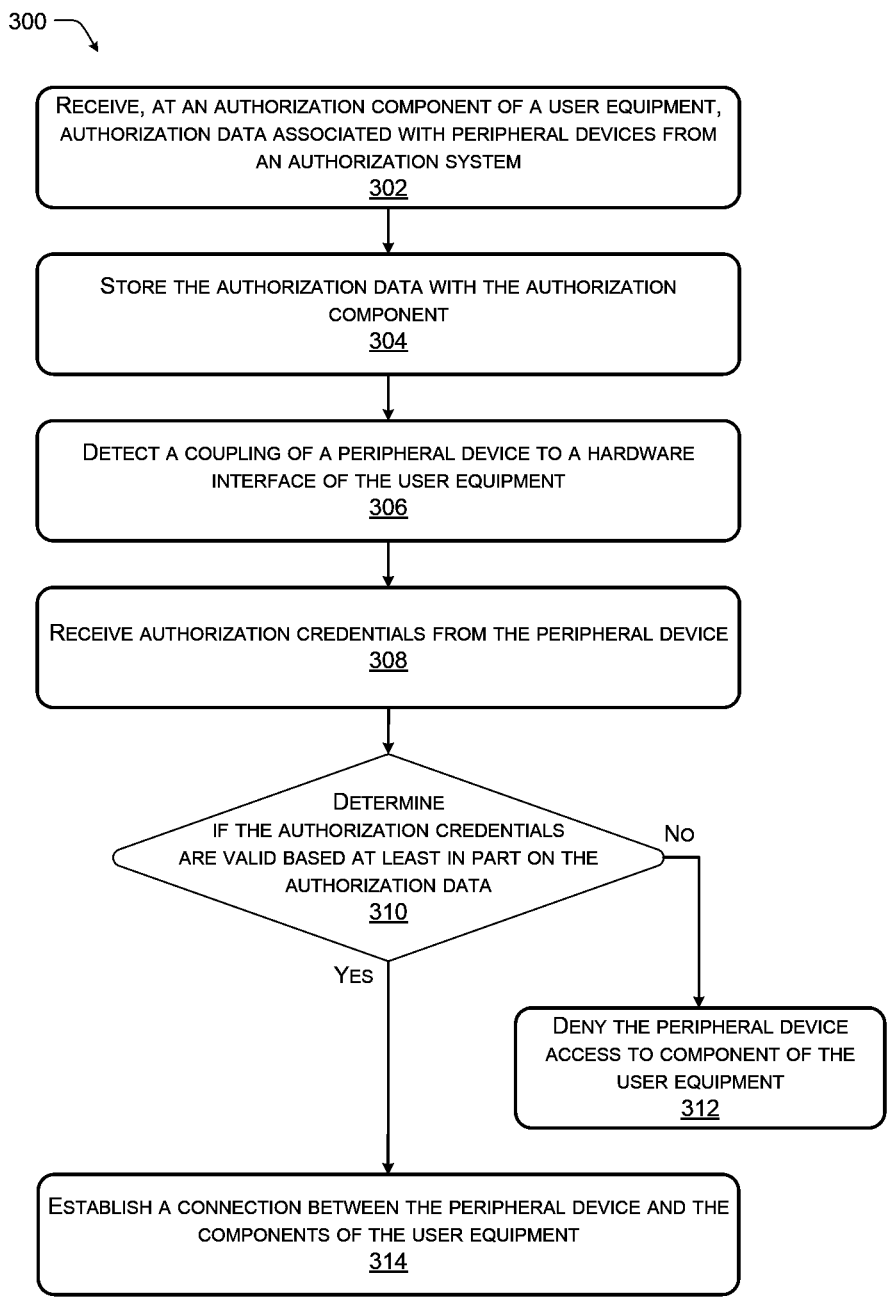
FIG. 3 illustrates an example flow diagram showing an illustrative process associated with the authorization component of FIGS. 1 and 2, in accordance with some examples of the present disclosure.
Figure 4:
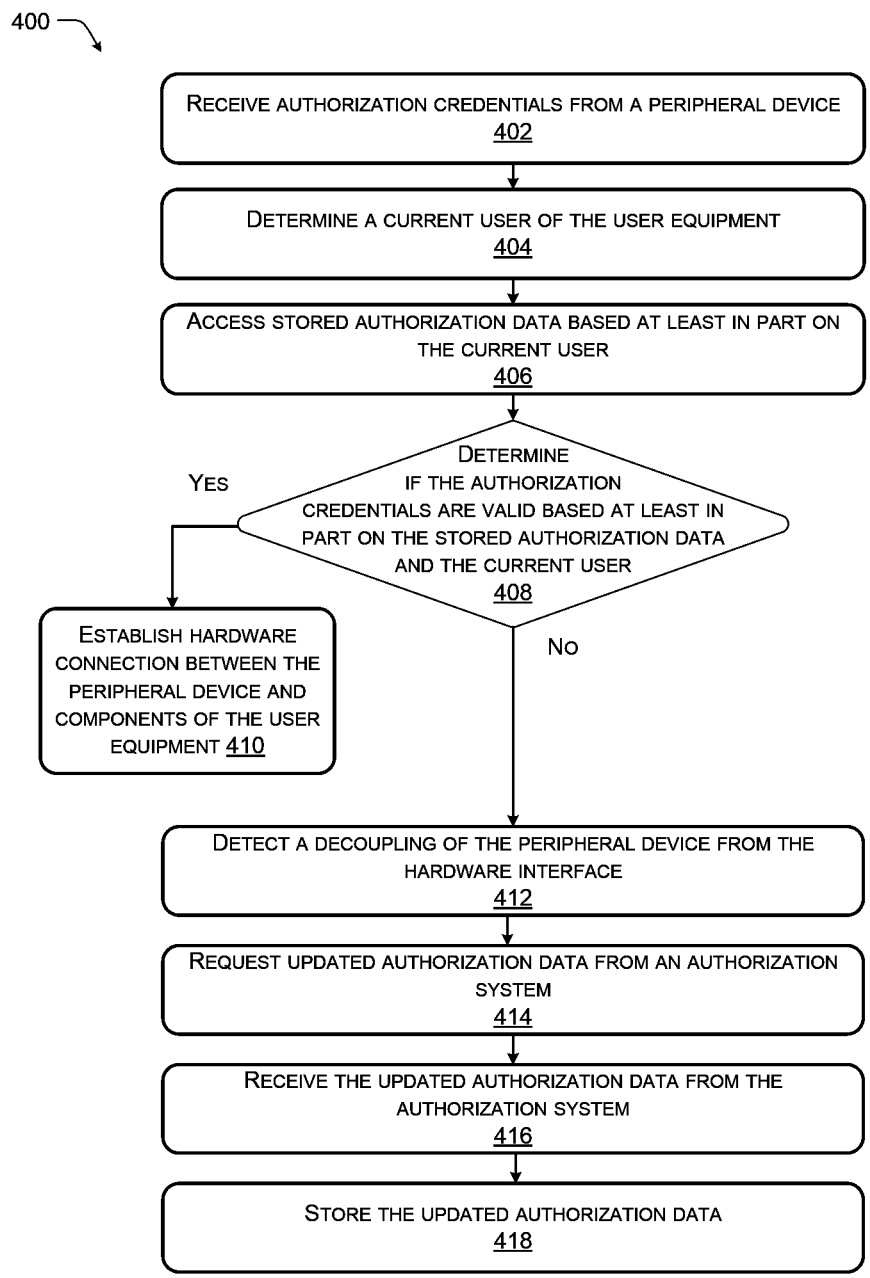
FIG. 4 illustrates another example flow diagram showing an illustrative process associated with the authorization component of FIGS. 1 and 2, in accordance with some examples of the present disclosure.

FIGS. 3-4 are flow diagrams illustrating example processes associated with the authorization component and system of FIG. 1 according to some implementations. The processes are illustrated as a collection of blocks in a logical flow diagram, which represent a sequence of operations, some or all of which can be implemented in hardware, software, or a combination thereof In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 illustrates an example flow diagram showing an illustrative process 300 associated with the authorization component of FIGS. 1 and 2, in accordance with some examples of the present disclosure. As discussed above, an authorization component may be incorporated into the hardware of a user equipment between the hardware interfaces (such as the USB or mini USB) and the other components of the user equipment to provide a physical or software decoupling between the hardware interface and the other components of the user equipment. By allowing the decoupling, unauthorized peripheral devices may be prevented from accessing the components of the user equipment and/or otherwise allowing malicious software from installing or accessing the user equipment.

At 302, the authorization component of the user equipment may receive authorization data associated with peripheral devices from an authorization system. In some cases, the authorization system may send the authorization data to the user equipment via a network. The authorization data may include public/private keys and the like. In some cases, the authorization component may request updates to the authorization data and/or the authorization system may push updates to the authorization data on various schedules such as ad hoc and/or periodic basis.

At 304, the authorization component may store the authorization data. For instance, the authorization component may include a dedicated memory that may be accessible to the authorization component even when the authorization component is decoupled from the other components of the user equipment. In some cases, the authorization component may be configured to couple and decouple from the other components at various times, such as on a periodic basis or upon a determination that no peripheral devices are coupled to the hardware interfaces. In these cases, the authorization component may couple to the other components to access the memories and/or network communication interfaces in order to download or otherwise store or update authorization data received from the authorization system on the dedicated memory accessible to the authorization component.

At 306, the authorization component may detect a coupling of a peripheral device to the hardware interface of the user equipment. In some cases, the detecting may be a signal from the hardware interface to the authorization component. In other cases, the detecting may be via one or more sensors or components that detect the physical couplings, such as one or more pins, usable to detect the coupling.

At 308, the authorization component may receive authorization credentials from the peripheral devices. For example, the authorization system may provision the peripheral device with the authorization credentials prior to providing the peripheral devices to the users. In some cases, the authorization credentials may be specific for a user, a type or status of the user (e.g., department), a location (such as a lab or office), and the like.

At 310, the authorization component may determine if the authorization credentials are valid based at least in part on the authorization data. For example, the authorization component may compare the authorization credentials to the authorization data to determine a match or apply one or more challenge response techniques with regards to the authorization credentials and the authorization data.

If, at 310, the authorization component determines that the authorization credentials are not valid, the process 300 may advance to 312 and, at 312, the authorization component may deny the peripheral device access to the components of the user equipment. For example, the authorization component may remain decoupled from the components of the user equipment until the authorization component detects a decoupling of the peripheral devices from the hardware interface or until valid authorization credentials are received from the current or additional peripheral devices.

If, at 310, the authorization component determines that the authorization credentials are valid, the process 300 may advance to 314 and, at 314, the authorization component may establish a connection between the peripheral device and the components of the user equipment. For instance, the authorization component may close a switch or latch to enable a physical coupling or hardware connection between the peripheral device and the components of the user equipment.

FIG. 4 illustrates another example flow diagram showing an illustrative process 400 associated with the authorization component of FIGS. 1 and 2, in accordance with some examples of the present disclosure. As discussed above, an authorization component may be incorporated into the hardware of a user equipment to provide a physical or software decoupling between the hardware interface and the other components of the user equipment. In this manner, an unauthorized peripheral device may be prevented from accessing the components of the user equipment and/or otherwise assisting in malicious software accessing the user equipment.

At 402, the authorization component may receive authorization credentials from a peripheral device. The peripheral device may be coupled to the user equipment via the hardware interface and at least temporarily prevented from accessing the other components of the user equipment by the authorization component. In some cases, the authorization system may provision the peripheral device with the authorization credentials prior to providing the peripheral devices to the users. In some cases, the authorization credentials may be specific for a user, a type or status of the user (e.g., department), a location (such as a lab or office), and the like.

At 404, the authorization component may determine a current user of the user equipment. For example, when the user logs on or initially accesses the user equipment, the authorization component may record or otherwise store the current user information (e.g., ID, name, etc.) on a local or dedicated memory associated with the authorization component. The authorization component may then access the user information in response to receiving the authorization credentials.

At 406, the authorization component may access stored authorization data based at least in part on the current user. For instance, based on the user information the authorization component may access any passwords, keys, and the like stored on the dedicated memory and associated with the user information. In other examples, the authorization data may be associated with a physical location of the user equipment, a status of the user equipment, a status of the user, and the like.

At 408, the authorization component may determine if the authorization credentials are valid based at least in part on the stored authorization data. For example, the authorization component may compare the authorization credentials to the stored authorization data to determine a match or apply one or more challenge response techniques with regards to the authorization credentials and the authorization data.

If, at 408, the authorization component determines that the authorization credentials are valid, the process 400 may advance to 410 and, at 410, the authorization component may establish a connection between the peripheral device and the components of the user equipment. For instance, the authorization component may close a switch or latch to enable a physical coupling or hardware connection between the peripheral device and the components of the user equipment.

If, at 408, the authorization component determines that the authorization credentials are not valid, the process 400 may advance to 412 and, at 412, the authorization component may detect a decoupling of the peripheral device from the hardware interface. In some cases, the authorization component may initially deny the peripheral device access to the components of the user equipment based on the results of 408. In these cases, the user may be attempting to reset the authorization data by decoupling the peripheral device and requesting the updated authorization data from the authorization system.

At 412, the authorization component may detect a decoupling of the peripheral device from the hardware interface. In some cases, the detecting may be a signal from the hardware interface to the authorization component. In other cases, the detecting may be via one or more sensors or components that detect the physical couplings, such as one or more pins, usable to detect the decoupling.

At 414, the authorization component may request updated authorization data from an authorization system. For example, the authorization component may couple to the component of the user equipment and cause a wireless communication interface to send or transmit the request to the authorization system. In some cases, the authorization component may send the rejected authorization credentials or other data (such as an ID or the like) associated with the peripheral device to the authorization system. In this manner, the authorization component may request or verify that the specific authorization credentials and/or the peripheral device is either authorized or not authorized to access the user equipment.

At 416, the authorization component may receive the updated authorization data from the authorization system. For instance, the authorization system may determine that the authorization component has out of date authorization data in response to the request and provide updated or additional authorization data in response.

At 418, the authorization component may store the updated authorization data. For instance, as discussed above, the authorization component may include a dedicated memory that may be accessible to the authorization component even when the authorization component is decoupled from the other components of the user equipment. In this manner, upon a recoupling of the peripheral device with the hardware interface, the authorization component may validate the authorization credentials using the updated authorization data and, if valid, connect the components of the user equipment with the peripheral device.

Figure 5:
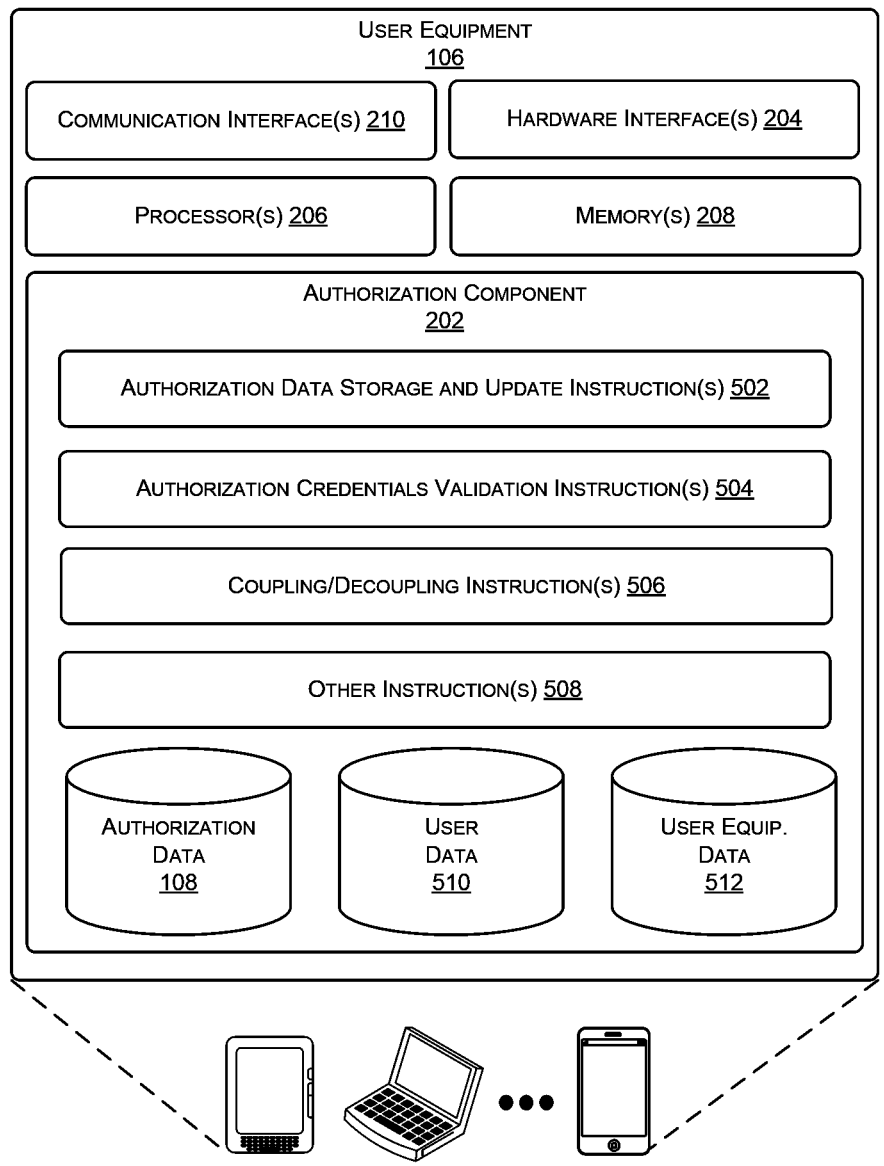
FIG. 5 illustrates an example hardware associated with the user equipment equipped with an authorization component, in accordance with some examples of the present disclosure.

FIG. 5 illustrates an example hardware associated with a user equipment 106 equipped with an authorization component 202, in accordance with some examples of the present disclosure. As discussed above, an authorization component 202 may be incorporated into the hardware of a user equipment 106 to provide a physical or software decoupling between the hardware interface 204 and the other components of the user equipment, such as the processor 206 and/or the memories 208. In this manner, an unauthorized peripheral device coupled to the hardware interface 204 may be prevented from accessing and/or infecting the components of the user equipment 106.

In some implementations, the communication interfaces 210 configured to facilitate communication between one or more networks, one or more cloud-based systems, and/or one or more devices, such as an authorization, as discussed above. In other examples, the communication interfaces 210 may also facilitate communication between one or more cellular or mobile communication networks, such as the corporate network. In some cases, the communication interfaces 210 may support both wired and wireless connection to various networks, such as cellular networks, radio, WiFi networks, infrared signals, local area networks, wide area networks, the Internet, and so forth. In one implementation, the communication interfaces 210 may be configured to receive authorization data 108 from the authorization system and provide the authorization data 108 to the authorization component 202.

In some implementations, the hardware interface 204 may include various types of interfaces and/or pins that may couple to external devices or peripheral devices that may be used in conjunction with the user equipment 106 by a user. In some instances, the hardware interface 204 may include USB interfaces, mini USB interfaces, serial input interfaces, parallel input interfaces, HDMI interfaces, digital visual interfaces (DVI), display port (DP) interfaces, tip-sleeve-ring interfaces, video graphics array (VGA) interfaces, and any other types of data, audio, and/or video interfaces.

The processor(s) 206 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In various embodiments, the processor(s) 206 can execute one or more modules, instructions sets, and/or processes to cause the user equipment 106 to perform a variety of functionalities. Additionally, each of the processor(s) 210 may possess its own local memory, which also can store program modules, program data, and/or one or more operating systems.

Depending on the exact configuration and type of the user equipment 106, the memories 208 may include computer readable media, computer storage media, and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data.

Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a user equipment.

In at least one example, the memories 208 can include non-transitory computer-readable media. Non-transitory computer-readable media can include volatile and nonvolatile, removable and non-removable tangible, physical media implemented in technology for storage of information, such as computer readable instructions, data structures, program modules, or other data. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information. Any such non-transitory computer-readable media can be part of the user equipment 106.

In the current example, the authorization component 202 may include and/or store one or more modules and data structures including, for example, authorization data storage and update instructions 502, authorization credentials validation instructions 504, coupling/decoupling instructions 506, as well as other instructions 508.

The one or more modules, instruction sets, and data structures can be in the form of stand-alone applications, productivity applications, an operating system component, or any other application or software module configured to perform operations as described herein. The authorization component 202 may also store data, such as authorization data 108 received from one or more authorization systems, user data 510 associated with one or more authorized users of the user equipment 106, and/or user equipment data 512.

In some implementations, the authorization component 202 may be implemented in hardware. In other implementations, the authorization component 202 may include one or more dedicated processors and/or memories to store and cause the authorization component 202 to perform the operations associated with the authorization data storage and update instructions 502, the authorization credentials validation instructions 504, the coupling/decoupling instructions 506, and the other instructions 508 as well as to store the authorization data 108, the user data 510, and the user equipment data 512.

Similar to processors 206, the processors of the authorization component 202 may represent, for example, a CPU-type processing unit, a FPGA, DSP, or other hardware logic components that can, in some instances, be driven by a CPU. Likewise, the memories of the authorization component 202 may be similar to the memories 208 and may include computer readable media, computer storage media, and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media and/or any storage medium that can be used to store and maintain information for access by a user equipment.

The authorization data 108 may include public/private keys and/or any type of data provide by an authorization system that may be used to validate authorization credentials of a peripheral device. In some cases, the authorization data 108 may be encrypted, compressed or otherwise encoded when stored.

The user data 510 may include information associated with each user of the user equipment 106. In some cases, the user data 510 may include a mapping or table that associates the authorization data 108 with each user, such that the authorization credentials validation instructions 504 of the authorization component 202 may determine if a peripheral device is authorized to access the components of the user equipment 106 while a specific user is active or logged in on the user equipment 106. For instance, in some cases, the user equipment 106 may be a shared resource and different users may be associated with different authorizations or access levels, different peripheral devices, and the like. In this example, the user data 510 may be used by the authorization credentials validation instructions 504 so that only peripheral devices that are allowed access to a specific user's account may be coupled to the user equipment 106 when the specific user is active on the user equipment 106.

The user equipment data 512 may include information associated with the user equipment 106. For instance, the user equipment 106 may be assigned to particular departments, may be assigned specific access levels or classes, or otherwise have a limited set of approved peripheral devices. Thus, the user equipment data 512 may also include restrictions on the authorization data 108 imposed by the characteristics or assigned traits of the user equipment 106. In some cases, the user equipment data 512 may be used by the authorization credentials validation instructions 504 of the user equipment 106 to assist with validating authorization credentials of particular peripheral devices.

The authorization data store and update instructions 502 may be configured to cause the authorization component 202 of the user equipment 106 to request or obtain authorization data 108 from the authorization system. For example, the authorization data store and update instructions 502 may be configured to update or request an update to the authorization data 108 upon the occurrence of specific types of events (e.g., a decoupling of a peripheral device from the hardware interface 204, an activation of the user equipment 106, a power down of the user equipment 106, and the like) and/or at various time based intervals, such as a periodic update (e.g., once an hour, once a week, once a month, etc.).

The authorization data store and update instructions 502 may also be configured to encrypt, encode, or compress the authorization data 108 prior to storing for later use. In some cases, the authorization data store and update instructions 502 may also decode, decrypt, and/or decompress the authorization data 108 when received from the authorization system prior to storing in one or more dedicated memories.

The authorization credentials validation instructions 504 may be configured to validate authorization credentials received from one or more peripheral devices in response to a peripheral device being coupled to the hardware interface 204 of the user equipment 106 and/or in response to other events, such as an activation of the user equipment 106. For instance, when the user equipment 106 is turned on by a user, various peripheral devices may be coupled to the user equipment 106 and the authorization credentials validation instructions 504 may validate each prior to providing a data coupling between the components of the user equipment 106 and each of the peripheral devices. Likewise, when a new peripheral device is inserted or coupled to a hardware interface 204 the authorization credentials validation instructions 504 may validate that the peripheral device is authorized to access the components of the user equipment 106.

In some cases, the authorization credentials validation instructions 504 may be configured to compare or otherwise validate the authorization credentials based at least in part on the authorization data 108. In some cases, the authorization credentials validation instructions 504 may also utilize the user data 510 and/or the user equipment data 512 to validate the authorization credentials provided by the peripheral device coupled to the hardware interface 204.

The coupling/decoupling instructions 506 may be configured to receive one or more signals from the authorization credentials validation instructions 504 and to couple the hardware interface 204, and thereby the peripheral device, to the other components of the user equipment 106 in response to the authorization credentials validation instructions 504 providing a signal indicating that the peripheral device is authorized to access the user equipment 106. In some cases, the coupling/decoupling instructions 506 may also recouple the authorization component 202 to the other components of the user equipment 106 when the coupling/decoupling instructions 506 determines that no peripheral device is coupled to the hardware interface 204 and/or only authorized peripheral devices are coupled to the hardware interfaces 204.

The coupling/decoupling instructions 506 may also be configured to decouple the hardware interface 204, and thereby the peripheral device, from the other components of the user equipment 106 in response to detecting a decoupling of an authorized peripheral device, a signal from the authorization credentials validation instructions 504 indicating an unauthorized peripheral device has been coupled to the hardware interface 204, a signal from the authorization credentials validation instructions 504 indicating an unvalidated peripheral device has been coupled to the hardware interface 204, and the like.

In some implementations, the coupling/decoupling instructions 506 may control a decoupling circuit or component that includes a first state and a second state. In the first state of the decoupling circuit, the authorization component 202 may be communicatively coupled to the hardware interface and communicatively decoupled from the other components of the user equipment 106, such as the processors 206, the memory 208, and/or the communication interfaces 210. In the second state of the decoupling circuit, the authorization component 202 may be communicatively coupled to the hardware interface and communicatively coupled to the other components of the user equipment 106. In some cases, the coupling/decoupling instructions 506 may cause the decoupling circuit to transition between the first state and the second state in response to various conditions, such as a detection of a peripheral device engaging the hardware interface 204 and/or an authentication of the peripheral device's authorization credentials. In some cases, the decoupling circuit may include one or more switches, latches, or other circuitry to physically decouple the authorization component 202 from the other components of the user equipment 106.

Figure 6:
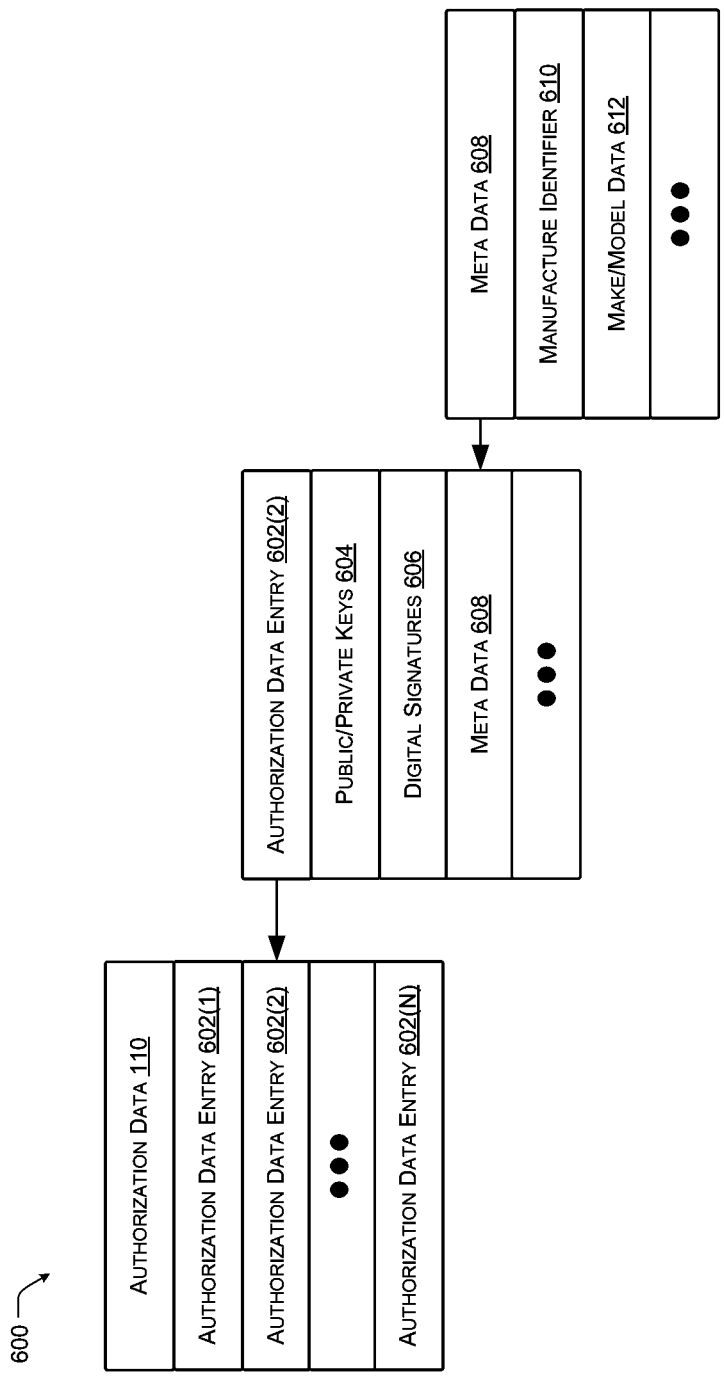
FIG. 6 illustrates an example block diagram illustrating an example scheme for the authorization data of FIGS. 1-5, in accordance with some examples of the present disclosure.

FIG. 6 illustrates an example block diagram illustrating an example scheme 600 for the authorization data 110 of FIGS. 1-5, in accordance with some examples of the present disclosure.

In the illustrated example, the authorization data 110 may be used by the authorization component using a public key infrastructure (PKI) and/or a digital certifications model. For instance, the authorization data 110 may represent defined authorities, such as manufactures, resellers, enterprise administrators, end or device users, and the like that that are able to certify a peripheral device via authorization credentials using the devices stored authorization data 110. Once a peripheral device is certified the device may trusted by the user equipment. In the illustrated example, the authorization data 110 may include a list of authorization data entries 602(1)-(N), each entry may correspond to one of the defined authorities.

As discussed above, the authorization data 110 may be stored on user equipment in association with the authorization component and may be represented as a per device unit. Thus, each entry 602 may include unique public/private keys or key pairs 604, and/or digital signatures 606 associated with a public/private keys 604. In some cases, corresponding keys and digital signatures of the authorization credentials may be presented to the authorization component to authenticate using the public/private keys or key pairs 604 and/or digital signatures 606 as a first step in the authorization process.

In some cases, individual entries 602 of the authorization data 110 may include meta data 608. The meta data 608 may include manufactures identifiers 610, make/model data 612, and other data associated with authorized or trusted peripheral devices. For example, a manufacturer may specify a specific manufacturer-model combination associated with a specific peripheral device and, thus, a specific key pair and/or digital signature that may be utilized to digitally sign the authorization data that may be stored on, and presented by, the peripheral device during the authentication process. The authorization component may then identify appropriate corresponding public/private keys 604 and/or digital signatures 606 based at least in part on the meta data 608 (e.g., the manufacture identifies 610, make/model data 612, and the like) associated with each entry 602. Once selected, the authorization component may check or otherwise authenticate the specific key pair and/or digital signature presented by the peripheral device with the public/private keys 604 and/or digital signatures 606 corresponding to specific manufacture identifies 610 and/or make/model data 612. In this example, if the authorization credentials are signed by an already trusted public key, then the process would continue with the challenge/response to ensure that the device actually possesses the private component of the authorization data. However, if no digital signature is present then the public key would be used for the authentication process.

In another example, the meta data 608 may be arbitrary data entered by an administrator and/or provided by the manufacturer of the peripheral device. In other examples, the authentication component may store the public keys 604 by themselves, with no associated meta data 608. In this example, the authentication data 110 may be used when the user equipment may be configured to only trust a single specific peripheral device rather than all devices from a manufacturer or of a specific make/model line.

In some examples, the authorization data 110 may also include a deny list of keys that are not to be trusted. In this example, the deny list allows the administrator the ability to disallow either a manufacturer, make/model, or specific devices from accessing one or more user equipment associated with the company or network. In one example, the deny list may be used in lieu of the authorization data entries 602, such as to create a deny only system in which the user equipment trusts all peripheral devices except the peripheral devices specified on the deny list.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
  detecting a coupling of a first peripheral device to a hardware interface of a user equipment;
  receiving authorization credentials from the first peripheral device;
  determining that the first peripheral device is not authorized to access the user equipment based at least in part on authorization data and the authorization credentials;

preventing the first peripheral device from accessing the user equipment;
sending, via a wireless communication channel, an alert to a remote system, the alert indicating an attempt to couple an unauthorized peripheral device to the user equipment has occurred;
receiving, at least partially in response to sending the alert and via the wireless communication channel, second authorization data from the remote system, the second authorization data associated with the first peripheral device;
determining that the first peripheral device is authorized to access the user equipment based at least in part on the authorization credentials and the second authorization data; and
allowing, in response to determining the first peripheral device is authorized, the first peripheral device to access the user equipment.

2. The method as claim 1 recites, further comprising:
detecting a coupling of a second peripheral device to the hardware interface;
receiving second authorization credentials from the second peripheral device;
determining that the second peripheral device is authorized to access the user equipment based at least in part on the authorization data and the second authorization credentials; and
allowing, in response to determining the second peripheral device is authorized, the second peripheral device to access the user equipment.

3. The method as claim 1 recites, wherein the alert includes data associated with at least one of the first peripheral device, an active user account on the user equipment, or an indication of a location of the user equipment.

4. The method as claim 1 recites, wherein preventing the first peripheral device from accessing the user equipment includes physically decoupling the hardware interface from at least one other component of the user equipment.

5. The method as claim 1 recites, wherein determining that the first peripheral device is not authorized to access the user equipment is based at least in part on one or more of a current user of the user equipment, a status of the user equipment, or a location of the user equipment.

6. A system comprising:
a communication interface;
a hardware interface for physically coupling to a peripheral device;
one or more processors;
an authorization component coupled between the hardware interface and the one or more processors and the communication interface, the authorization component configured to perform operations including:
receiving, wirelessly via the communication interface, authorization data from a remote system;
decoupling the hardware interface from the communication interface and the one or more processors;
detecting a physical coupling of a first peripheral device to the hardware interface;
receiving authorization credentials from the first peripheral device;
determining that the first peripheral device is not authorized to access the system based at least in part on the authorization data and the authorization credentials;
sending an alert to the remote system, the alert indicating an attempt to couple an unauthorized peripheral device to the system has occurred;
receiving, at least partially in response to sending the alert, second authorization data from the remote system, the second authorization data associated with the first peripheral device;
determining that the first peripheral device is authorized to access the system based at least in part on the authorization credentials and the second authorization data; and
in response to determining the first peripheral device is authorized, recoupling the hardware interface to the communication interface and the one or more processors.

7. The system as recited in claim 6, wherein the decoupling the hardware interface from the communication interface and the one or more processors is a physical decoupling.

8. The system as recited in claim 6, wherein the authorization component is further configured to perform operations including determining a current location of the system and wherein determining the first peripheral device is authorized to access the system is based at least in part on the current location.

9. The system as recited in claim 6, wherein the authorization component is further configured to perform operations including determining a current user associated with the system and wherein determining the first peripheral device is authorized to access the system is based at least in part on the current user.

10. The system as recited in claim 6, wherein:
the authorization component includes a memory accessible to the authorization component when the hardware interface is decoupled from the communication interface and the one or more processors; and
the authorization component is further configured to perform operations including storing the authorization data in the memory.

11. An authorization component of a user equipment comprising:
a decoupling circuit having a first state in which the authorization component is communicatively coupled to a hardware interface and communicatively decoupled from other components of the user equipment and a second state in which the authorization component is communicatively coupled to the hardware interface and the other components of the user equipment;
one or more processors;
a non-transitory computer-readable media accessible to the one or more processors when the decoupling circuit is in the first state, the non-transitory computer-readable media storing computer-executable instructions, which when executed by the one or more processors cause the one or more processors to perform operations including:
storing authorization data associated with one or more peripheral devices on the non-transitory computer-readable media;
causing the decoupling circuit to enter the first state;
detecting a physical coupling of a first peripheral device to the hardware interface;
receiving authorization credentials from the first peripheral device;
determining that the first peripheral device is not authorized to access the user equipment based at least in part on the authorization data and the authorization credentials;

sending an alert to a remote system, the alert indicating an attempt to couple an unauthorized peripheral device to the user equipment has occurred;

receiving, at least partially in response to sending the alert, second authorization data from the remote system, the second authorization data associated with the first peripheral device;

determining that the first peripheral device is authorized to access the user equipment based at least in part on the authorization credentials and the second authorization data; and in response to determining the first peripheral device is authorized, causing the decoupling circuit to transition to the second state.

12. The authorization component as recited in claim 11, wherein the decoupling circuit causes a physical decoupling between the authorization component and the other components of the user equipment.

13. The authorization component as recited in claim 11, wherein determining that the first peripheral device is not authorized to access the user equipment is based at least in part on one or more of the following:

data associated with a current user of the user equipment;

data associated with the user equipment; or data associated with the first peripheral device.

14. The authorization component as recited in claim 11, wherein the non-transitory computer-readable media stores additional computer-executable instructions, which when executed by the one or more processors cause the one or more processors to perform operations including:

detecting a decoupling of the first peripheral device from the hardware interface; and causing the decoupling circuit to transition to the first state.

\* \* \* \* \*